United States Patent [19]

Sather

[11] 3,757,261

[45] Sept. 4, 1973

[54] INTEGRATION AND FILTRATION CIRCUIT APPARATUS

[75] Inventor: Delaine C. Sather, Cedar Rapids, Iowa

[73] Assignee: Collins Radio Company, Dallas, Tex.

[22] Filed: Feb. 11, 1972

[21] Appl. No.: 225,443

[52] U.S. Cl............................. 235/152, 235/150.31
[51] Int. Cl............................ G06f 7/38, G06f 15/34
[58] Field of Search................... 235/152, 156, 183, 235/150.3, 150.31, 158

[56] References Cited
UNITED STATES PATENTS 3,676,656   7/1972   Schmidt.................... 235/150.3 X
3,679,879   7/1972   Seki et al................... 235/150.31
3,609,568   9/1971   Jackson..................... 235/156 X
3,639,739   2/1972   Golden et al................ 235/152

*Primary Examiner*—Charles E. Atkinson
*Assistant Examiner*—James F. Gottman
*Attorney*—Bruce C. Lutz et al.

[57] ABSTRACT

A digital word serial integrator circuit is disclosed which can be utilized as the basis for various types of filter circuits. The filter circuits all utilize serial digital input words and produce digital output words and in the process provide low and high pass filtration functions as well as multiplication, division, and square root functions.

21 Claims, 28 Drawing Figures

WORD TIME (N) EQUATIONS $R_N = A_N + \Delta Y_N \times B_N - 32768 \times \Delta Z_{N+1}$
WHERE,
$\Delta Z_{N+1} = +1$ IF $A_N$ IS (+), $\Delta Y_N \times B_N$ IS (+)
AND $(A_N + \Delta Y_N \times B_N)$ IS (−)

$\Delta Z_{N+1} = -1$ IF $A_N$ IS (−), $\Delta Y_N \times B_N$ IS (−)
AND $(A_N + \Delta Y_N \times B_N)$ IS (+)

CLOCK BITS(C) 
SYNC BIT(SB)
| WORD TIME 1 | WORD TIME 2 | WORD TIME 3 | ---- | WORD TIME 32768 | WORD TIME 32769 |
INCREASING TIME
1 SECOND INTERVAL
FIG. 3
| SERIAL BINARY WORD BITS INCREASING WITH TIME → 1 2 3 4 5 6 7 8 9 10 11 12 13 14 15 16 | WEIGHTED VALUE OF WORD |
|---|---|
| 1 1 1 1 1 1 1 1 1 1 1 1 1 1 1 0 | +32767 |
| 0 0 0 0 0 0 0 0 0 0 0 0 0 1 1 0 | +24576 |
| 0 0 0 0 0 0 0 0 0 0 0 0 0 0 1 0 | +16384 |
| 0 0 0 0 0 0 0 0 0 0 0 0 0 1 0 0 | +8192 |
| 1 0 0 0 0 0 0 0 0 0 0 0 0 0 0 0 | +1 |
| 0 0 0 0 0 0 0 0 0 0 0 0 0 0 0 0 | 0 |
| 1 1 1 1 1 1 1 1 1 1 1 1 1 1 1 1 | −1 |
| 0 0 0 0 0 0 0 0 0 0 0 0 0 1 1 1 | −8192 |
| 0 0 0 0 0 0 0 0 0 0 0 0 0 0 1 1 | −16384 |
| 0 0 0 0 0 0 0 0 0 0 0 0 0 1 0 1 | −24576 |
| 0 0 0 0 0 0 0 0 0 0 0 0 0 0 0 1 | −32768 |
FIG. 4
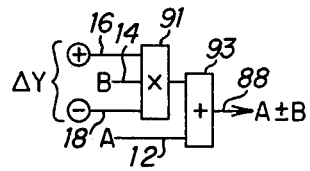
$(A \pm B)_N = A_N + \Delta Y_N \times B_N$
WHERE,
$\Delta Y_N = +1, -1, \text{ OR } 0$
FIG. 5

BIT TIME (n) LOGIC TABLE
| A | B | Q | +ΔY | -ΔY | A±B | $Q_{n+1}$ $\overline{SB}$ | $Q_{n+1}$ SB |
|---|---|---|---|---|---|---|---|
| 0 | 0 | 0 | 0 | 0 | 0 | 0 | 0 |
| 1 | 0 | 0 | 0 | 0 | 1 | 0 | 0 |
| 0 | 1 | 0 | 0 | 0 | 1 | 0 | 0 |
| 1 | 1 | 0 | 0 | 0 | 0 | 0 | 0 |
| 0 | 0 | 0 | 1 | 0 | 1 | 0 | 0 |
| 1 | 0 | 0 | 1 | 0 | 0 | 1 | 0 |
| 0 | 1 | 0 | 1 | 0 | 0 | 1 | 0 |
| 1 | 1 | 0 | 1 | 0 | 1 | 0 | 0 |
| 0 | 0 | 1 | 1 | 0 | 1 | 0 | 0 |
| 1 | 0 | 1 | 1 | 0 | 0 | 1 | 0 |
| 0 | 1 | 1 | 1 | 0 | 0 | 1 | 0 |
| 1 | 1 | 1 | 1 | 0 | 1 | 1 | 0 |
| 0 | 0 | 0 | 0 | 1 | 1 | 0 | 0 |
| 1 | 0 | 0 | 0 | 1 | 0 | 1 | 0 |
| 0 | 1 | 0 | 0 | 1 | 0 | 1 | 0 |
| 1 | 1 | 0 | 0 | 1 | 1 | 0 | 0 |
| 0 | 0 | 1 | 0 | 1 | 1 | 0 | 0 |
| 1 | 0 | 1 | 0 | 1 | 0 | 0 | 0 |
| 0 | 1 | 1 | 0 | 1 | 0 | 0 | 0 |
| 1 | 1 | 1 | 0 | 1 | 1 | 1 | 0 |
FIG. 6
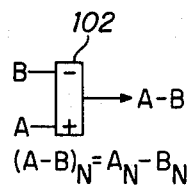
FIG. 8
$(A-B)_N = A_N - B_N$
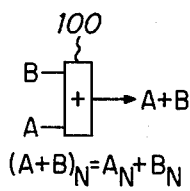
FIG. 7
$(A+B)_N = A_N + B_N$
| A | B | Q | +ΔY | -ΔY | $\overline{SB}$ R | $Q_{n+1}$ | $+\Delta Z_{n+1}$ | $-\Delta Z_{n+1}$ | SB R | $Q_{n+1}$ | $+\Delta Z_{n+1}$ | $-\Delta Z_{n+1}$ |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 1 | 0 | 0 | 0 | 1 | 0 | 0 | 0 |
| 0 | 1 | 0 | 0 | 0 | 0 | 0 | 0 | 0 | 0 | 0 | 0 | 0 |
| 1 | 1 | 0 | 0 | 0 | 1 | 0 | 0 | 0 | 1 | 0 | 0 | 0 |
| 0 | 0 | 0 | 1 | 0 | 0 | 0 | 0 | 0 | 0 | 0 | 0 | 0 |
| 1 | 0 | 0 | 1 | 0 | 1 | 0 | 0 | 0 | 1 | 0 | 0 | 0 |
| 0 | 1 | 0 | 1 | 0 | 1 | 0 | 0 | 0 | 1 | 0 | 0 | 0 |
| 1 | 1 | 0 | 1 | 0 | 0 | 1 | 0 | 0 | 0 | 0 | 0 | 1 |
| 0 | 0 | 1 | 1 | 0 | 1 | 0 | 0 | 0 | 0 | 0 | 1 | 0 |
| 1 | 0 | 1 | 1 | 0 | 0 | 1 | 0 | 0 | 0 | 0 | 0 | 0 |
| 0 | 1 | 1 | 1 | 0 | 0 | 1 | 0 | 0 | 0 | 0 | 0 | 0 |
| 1 | 1 | 1 | 1 | 0 | 1 | 1 | 0 | 0 | 1 | 0 | 0 | 0 |
| 0 | 0 | 0 | 0 | 1 | 0 | 0 | 0 | 0 | 0 | 0 | 0 | 0 |
| 1 | 0 | 0 | 0 | 1 | 1 | 0 | 0 | 0 | 1 | 0 | 0 | 0 |
| 0 | 1 | 0 | 0 | 1 | 1 | 1 | 0 | 0 | 0 | 0 | 1 | 0 |
| 1 | 1 | 0 | 0 | 1 | 0 | 0 | 0 | 0 | 0 | 0 | 0 | 0 |
| 0 | 0 | 1 | 0 | 1 | 1 | 1 | 0 | 0 | 1 | 0 | 0 | 0 |
| 1 | 0 | 1 | 0 | 1 | 0 | 0 | 0 | 0 | 0 | 0 | 0 | 1 |
| 0 | 1 | 1 | 0 | 1 | 0 | 1 | 0 | 0 | 0 | 0 | 0 | 0 |
| 1 | 1 | 1 | 0 | 1 | 1 | 1 | 0 | 0 | 1 | 0 | 0 | 0 |
NO CHANGE
FIG. 9

$R_N = R_{N-1} + A_N - 32768 \times \Delta Z_{N+1}$
WHERE,
$\Delta Z_{N+1} = +1$ IF $R_{N-1}$ IS (+), $A_N$ IS (+)
AND $(R_{N-1} + A_N)$ IS (−)
$\Delta Z_{N+1} = -1$ IF $R_{N-1}$ IS (−), $A_N$ IS (−)
AND $(R_{N-1} + A_N)$ IS (+)

WHERE,
$T = \frac{1}{B}$ SECONDS $$OUT = IN \left[\frac{1}{ST}\right]$$

WHERE, $T = \frac{32768}{A \times B}$ SECONDS $OUT_1 = IN\left[\dfrac{ST}{1+ST}\right]$ (HI PASS)

$OUT_2 = IN\left[\dfrac{1}{1+ST}\right]$ (LOW PASS)

WHERE, $T = \dfrac{32768}{A \times B}$ SECONDS $OUT = \dfrac{IN \times A}{32768}\left[\dfrac{1}{1+ST}\right]$ WHERE, $T = \dfrac{1}{B}$ SECONDS $$OUT = \frac{32768 \times IN}{A}\left[\frac{1}{1+ST}\right]$$

WHERE, $T = \frac{32768}{A \times B}$ SECONDS $$\text{OUT} = \sqrt{\frac{32768 \times \text{IN}}{1+ST}}$$

WHERE, $T = \dfrac{32768}{B(\text{OUT})}$ SECONDS

+128 = 0.0 0 0 0 0 0 1 0 0 0 0 0 0 0 0
−129 = 1 1 1 1 1 1 1 0 1 1 1 1 1 1 1 1

INTEGRATION AND FILTRATION CIRCUIT APPARATUS

The present invention is directed towards electronics and more specifically towards electronics involving the use of serial digital words. Even more specifically, the present invention is directed toward the use of a serial integrator for providing both integration and various types of serial word filtration.

It is realized by the applicant that there are many types of integrators and filtration circuits in the prior art but it is believed that the present invention incorporates a novel approach to the problem of serial digital word integration and filtration and further utilizes a small number of different circuits in a somewhat repetitive fashion to obtain various system results.

Basically, the integration is performed by first changing the serial digital word to a pulse rate representative of the digital word and then using a storage system which counts the number of pulses received from the digital word to pulse rate converter and in accordance with a time constant input provides a serial digital word output indicative of that input in accordance with the determined time constant. The time constant range of this integrator can be increased by adding a further stage intermediate the digital word to pulse rate converter and the pulse rate to digital word converter. This intermediate stage may be called a combination pulse rate to digital word and digital word to pulse rate converter.

The second described integrator can be converted to a serial digital word filter by comparing the output of the integrator to an input signal before application to the integrator section so that no output is obtained when the two are identical. When they are not identical there is a change in accordance with the time constant of the integrating circuit. If the filter output signal is obtained from the output of the previously referenced integrator, a low pass filter will be obtained. On the other hand, if the output signal is obtained from the output of the comparison network, a high pass filter will be obtained.

A serial digital word multiplication circuit may be obtained from the previously referenced longer time constant serial integrator in the following manner. As previously indicated, the second serial integrator is formed by having a combination pulse rate to digital word and digital word to pulse rate converter. If the output of the serial integrator is compared with the digital word obtained in this combination unit, a system will be obtained which ceases changes in output when the output signal is directly proportional to the product of the input signal and the first time constant affecting signal. The second time constant affecting signal remains as the only word producing an effect on the time constant of the output signal. As will be realized, the multiplication is not instantaneous since it requires at least the full period of the time constant to obtain a fairly accurate or stable output.

The multiplication circuit may be converted to a division circuit by interchanging the connections of the first input signal to be multiplied and the feedback signal from the apparatus output. Again, this provides a comparison function of an input signal A with a modification of the output signal to produce no change after the circuit has stablized. This same type of reasoning may then be utilized to produce a square root circuit.

It is therefore an object of the present invention to utilize digital to analog and analog to digital circuitry in a new and novel way to provide an integrating circuit and derivatives thereof.

Other objects and advantages of the present invention will be apparent from a reading of the specification and appended claims in conjunction with the drawings wherein:

FIG. 3 is a serial word timing diagram illustrating that there are 16 clock bits for each sync bit and that the sync bit occurs at the end of each word time;

FIG. 4 is a graphic representation of the serial binary words and their value as utilized in the present invention;

FIG. 5 illustrates the block diagram of a serial summing circuit as may be obtained from the upper portion of FIG. 1;

FIG. 6 is a logic table representative of the operation of FIG. 1 when the portion of FIG. 5 is utilized;

FIGS. 7 and 8 illustrate, respectively, serial adders and subtractors obtainable utilizing the summing circuit of FIG. 1;

FIG. 9 is a logic table of the operation of the block diagram of FIG. 2 or alternatively of the circuit diagram of FIG. 1;

DETAILED DESCRIPTION

Figure 1:
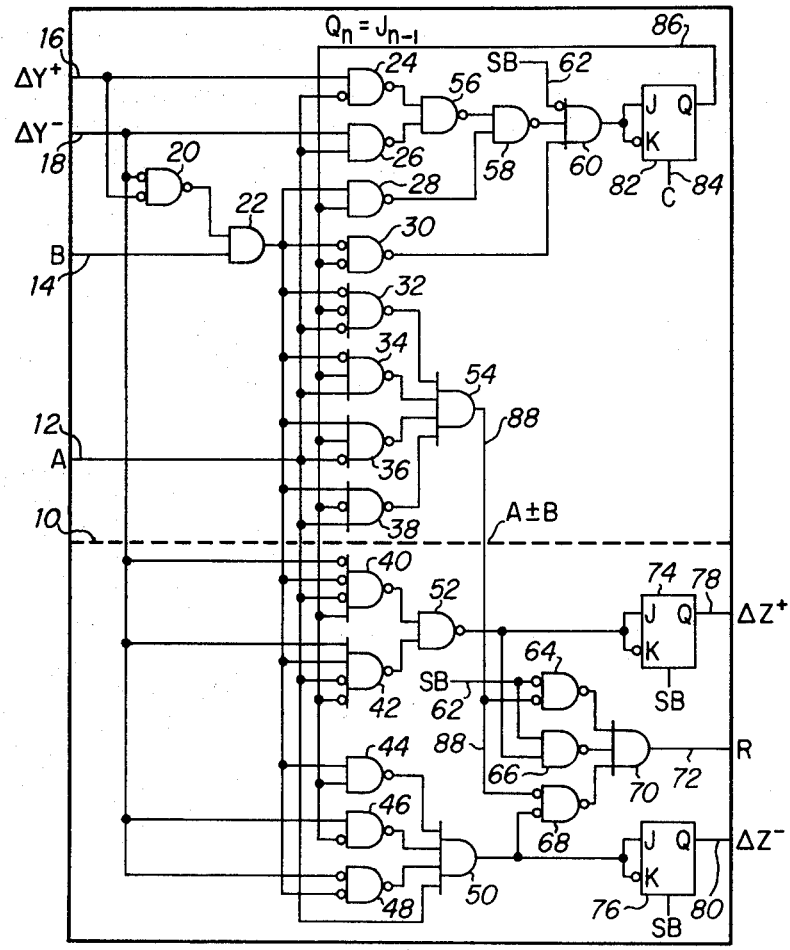
FIG. 1 is a detailed block schematic diagram of all the components utilized in the present invention with the exception of a shift register as a word storage means.

In FIG. 1 a dash line 10 is used to separate two portions of this circuit into upper and lower parts for simplifying the explanation infra. A first input labeled A is given the numerical designation of 12 while a second input B is given 14. Inputs of $\Delta Y+$ and $\Delta Y-$ are provided with designations 16 and 18, respectively. It may be noted that the inputs 16 and 18 are provided to an OR circuit 20 (an AND gate with all inverting inputs and an inverting output) whose output in combination with lead 14 are provided to an AND circuit 22. The leads 12–18 and the output of AND circuit 22 are provided as shown to a first plurality of combining circuits designated as 24–48 whose outputs are further combined in circuits labeled 50–70. Combining circuit 60 has an input 62 labeled SB which is representative of the synchronization bit. The synchronization bit is also applied to a pair of gates 64 and 66 which along with gates 68 and 70 comprise a portion of an overflow indication circuit for providing an output R to be later defined. The R output is supplied on lead 72. The sync bit input is also supplied to a pair of J-K flip-flops 74 and 76 which provide outputs 78 and 80, respectively, indicative of the positive overflow condition $\Delta Z+$ or the negative overflow condition $\Delta Z-$. The output of circuit 60 is applied to a J-K flip-flop 82 having a clock input on lead 84 and having a Q output 86 which is utilized in a feedback manner to a plurality of the gates in both sections of FIG. 1. It will be further noted that an output of gate 54 designated as 88 has the further label of $A \pm B$.

Figure 2:
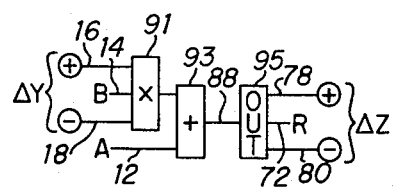
FIG. 2 is a block diagram and equations representative thereof equivalent to the contents of FIG. 1.

Referring now to FIG. 2, similar leads are provided with similar numerical designations as in FIG. 1. The upper portion of FIG. 1 above the dividing dash line 10 comprises the multiplying block 91 and the adding block 92. The combination of blocks 91 and 93 provide the contents of a serial summing circuit. This will be expanded upon in FIG. 5. The output of 93 is the $A \pm B$ output previously designated which goes into a further block 95 which may be designated as an overflow indication block. In other words, block 95 checks the serial digital word and if it exceeds a design or predetermined word magnitude, it will provide an indication on one of the outputs 78 or 80 indicative of the fact that it has been exceeded and will provide an output on lead 72 of the difference between the actual summation of the word and the design word magnitude. Block 95 constitutes the lower portion of FIG. 1.

The output R on lead 72 is shown by the equation of FIG. 2 were N is word time. The equations also indicate that the overflow indication is provided at the time of the word following the word in which overflow occurred. As will be further noted, lead 78 will be a positive 1 if at the time overflow occurred the A word is positive and the product of the input on either lead 16 or 18 and the digital word on lead 14 is positive and if the sum of these two digital words is negative. It should be noted that leads 78 and 80 are normally 0 and are a logic 1 only after overflow has occurred and further that both of these leads cannot be a logic 1 at the same time. The design of the circuit is such that leads 16 and 18 are not to be a logic 1 at the same time either. However, this is an input and the condition can be controlled. While leads 16 and 18 are often held to a particular ground or logic level, when the circuit of FIG. 2 is used as an adding circuit, the leads 16 and 18 are normally 0 and are changed to a logic 1 representative of +1 or −1 when adding is to occur.

FIG 3 illustrates that one embodiment of this invention was designed such that a clock frequency of 524,288 bits per second was used and the serial words were 16 bits each. Thus, 32,768 words occurred each second. As will be noted, a sync bit occurs once each word time.

FIG. 4 illustrates the fact that in time the least significant bit appears first and the most significant bit or sign bit appears last. Thus, the chart illustrates various symbolic numbers in both the binary and decimal representation.

FIGS. 5–8

SIGNAL SUMMING MEANS

FIG. 5 illustrates in block diagram form the signal combining or summing top half of FIG. 1. The top half of FIG. 1 provides the operation of a signal combining network which may either add or subtract with the input A on line 12 being combined with the product of B on line 14 and either $+\Delta Y$ or $-\Delta Y$ on lines 16 and 18. As will be noted from the notations in FIG. 5, $\Delta Y_N$ is equivalent to either +1, −1, or 0. For a specific combining operation, only one of lines 16 and 18 are a logic 1, and the other is a logic 0. This is further amplified upon in the chart of FIG. 6 which provides a logic table for the serial summer comprising the top half of FIG. 1. As will be noted by the last column in FIG. 6, the output $Q_n$ from the J-K flip-flop 82 on lead 86 is a carry bit. If there is no sync bit, the next Q bit may be a logic 1 when the inputs are proper. However, in the presence of a sync bit, the Q output becomes 0 during the following bit time since the carried bit would then be added to the next word and result in error. As may be ascertained from the table of FIG. 6, the Q output is one bit delayed from the input bits occurring on lines A and B. Since the operation of FIG. 5 and its detailed circuit diagram in the upper portion of FIG. 1 is obvious from a review of the table of FIG. 6, further comments will be avoided except to indicate that it should be realized that the $\Delta Y$ input may be used to provide either subtraction or addition operations.

The addition operation occurs when lead 16 is held at a positive valve such as 5 volts D-C and lead 18 is held at ground. The addition diagram is illustrated in FIG. 7 for this type of connection. The $\Delta Y$ inputs to the block 100 are not illustrated in FIG. 7 since these values are held constant for the addition operation and thus the unit operates in accordance with the formula shown. It will be realized that the block 91 of FIG. 2 is still being utilized in the addition operation of FIG. 7 but is not shown since it is not a necessary part of the addition operation. As will be realized from information infra, the block 91 is part of a standard chip produced by the assignee of the inventor and is used in purely additive operations merely because it exists and not because it is required. Since this block 91 is required for many other operations, it is desirable that it be built into the flat pack containing these circuit portions.

FIG. 8 illustrates the use of the signal combining or summing upper portion of FIG. 1 as a subtractor. In this case the line 16 will be held at ground while line 18 is held at a positive 5 volts. With this connection of the ΔY inputs, the serial digital word applied on B line 14 is subtracted from the A serial digital word applied on A line 12 in accordance with the equations supplied in conjunction with FIG. 8.

FIG. 9

CIRCUIT LOGIC TABLE

As indicated previously, FIG. 9 is the logic table for the circuitry of FIG. 1 which is simplified in block diagram form in FIG. 2. As previously indicated, the ΔZ outputs are indicative of overflow conditions of a word and occur during the word time after which overflow is indicated. Thus, according to the logic table there is no change in the ΔZ outputs when there is no sync bit. On the other hand, upon the occurrence of a sync bit a change may occur as shown in accordance with the values of the most significant bits in the word and the carry bit occurring on line 86. When this change occurs, it remains in the logic 1 or logic 0 condition during the entire next word time until the following sync bit.

Whenever a positive value word supplied on line 14 is added to a positive value word supplied on line 12 to cause a sum more positive than the 32,768 binary numerical word representation of the equivalent decimal number available from the use of 16 binary bits, the output on line 72 becomes equal to this sum minus 32,768. This condition also causes a logic 1 (in one embodiment 5 volts) output to appear on the ΔZ+ lead 78 during the next word time. The above conditions also occur when a negative word on line 14 is subtracted from the positive word on line 12.

Whenever a negative value word on line 14 is added to a negative value word on line 12 to cause a sum more negative than minus 32,768, the output on line 72 becomes equal to this sum plus 32,768. This condition causes a logic 1 to appear on the ΔZ− output lead 80 during the next word time. This same condition occurs when a positive value word on line 14 is subtracted from the negative value word on line 12 to cause a sum more negative than minus 32,768.

Under all other conditions the output on lead 72 equals the sum of the digital words on lead 12 and 14 and the ΔZ outputs on lead 78 and 80 are held at a logic 0 (in this case ground potential). The entire contents of FIG. 1 are described in the prior art as a serial R - adder, a similar version of which may be found produced by General Instrument Corporation Microelectronics Division of Hicksville, New York under the part number MEM5021.

Although the logic table of FIG. 9 is in bit time, it may be ascertained from an examination thereof the type of words that are being added or subtracted in accordance with the most significant bit occurring at the time of the sync bit. As will be noted, the first 4 horizontal rows illustrate conditions when both the leads 16 and 18 are at a logic 0 and therefore the effect of any digital words on line 14 are nullified. Thus, the output is indicative only of the input on line 12. The next eight horizontal rows are indicative of addition since lead 16 is held at a logic 1 and lead 18 is held at a logic 0. The fourth condition of this addition process illustrates that the lead 80 contains a logic 1 during the next word time. This is indicative of the addition of two large negative numbers having a combined value of greater than 32,768. This is evidenced by the fact that the most significant or sign bit in each case is a logic 1 while the next previous bits are not logic 1's as indicated by the fact that there is no carry on the Q line 86.

The following or fifth condition of adding illustrates the addition of two positive numbers whose combined total is greater than 32,768 as illustrated by the fact that the bits at the most significant position are a logic 0 and the fact that there is a carry bit on the lead 86. An examination of FIG. 4 will illustrate that there will be no carry unless at least one of the numbers is greater than 16,384.

The last eight horizontal rows of digits in the table of FIG. 9 illustrate the condition of subtraction as indicated by the fifth vertical column indicating the logic 1 being applied to line 18. The third horizontal row of the subtraction process illustrates a logic 1 occurring on lead 78 during the next word time after the occurrence of a negative word being subtracted from a positive word to produce a word greater than a positive 32,768 as indicated by the lack of a carry on lead 86. Similar reasoning may be used in the third to the last horizontal column where a large positive number is subtracted from a negative number and the result is greater than minus 32,768.

FIGS. 10–11

SERIAL/INCREMENTAL CONVERTER

Figure 10:
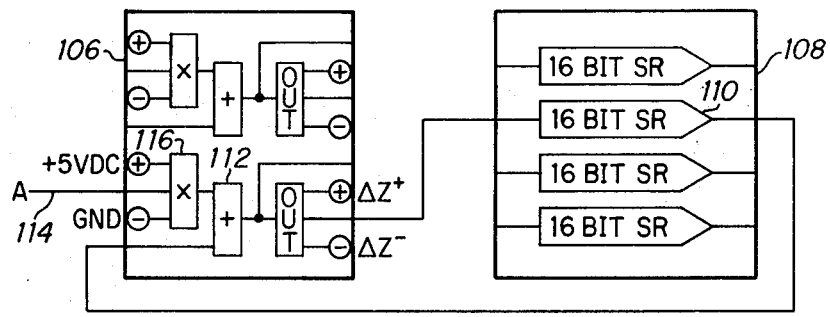
FIG. 10 illustrates a pair of integrated circuit flat packs utilizing the circuitry of FIGS. 1 and 2 repetitively, and further shows a specific connection thereof to produce a serial/incremental converter.

FIG. 10 illustrates a flat pack containing two FIG. 2 equivalents. In other words, the entire contents of FIG. 1 are contained on the flat pack 106 in two different places. A further flat pack 108 contains four 16-bit shift registers as shown. These shift registers, one of which is designated as 110, may also be termed word storage means or delay means since the primary purpose of the shift register 110 is to delay the resubmission of the word back to an adder 112 until the occurrence of the first bit of the next word being supplied on the A input 114. The shift register 110 may be of any standard design an example of which may be found in the aforementioned General Instrument Corporation brochures and given the part number MEM3016. Since one embodiment of the invention incorporated a flat pack containing four shift registers, four such shift registers are shown in the flat pack of 108 and in the flat pack of following figures illustrating connections of the flat packs to form various versins of the invention. As will be noted, the inputs to the ΔY terminals of the multiplying circuit 116 are held at ground and plus 5 volts, the circuitry of 116 merely passes the digital word being supplied on lead 114 to the adding circuit 112 unaltered.

Figure 11:
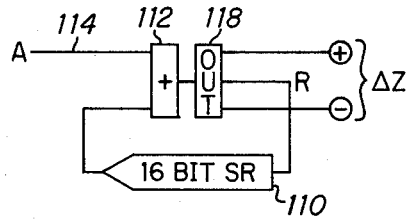
FIG. 11 is the block diagram of a serial/incremental converter as shown connected in FIG. 10.

FIG. 11 illustrates the connections of FIG. 10 in simplfieid form and shows a digital word 114 being supplied to a summer (an adder here) 112 whose output is supplied to an overflow indicating circuit 118. Further, the circuit 118 has an output supplied through a shift register 110 and back to a second input of summing means 112 and has a ΔZ or overflow indication output terminal to indicate overflow conditions.

The circuit of FIG. 11 operates to transform a digital word into an analog pulse rate out. In other words, an input digital word supplied on lead 114 is added to itself each word time through the cooperation of the storage means 10 until the total summation exceeds the word bit capacity of the shift register 110. At this time the output will be reduced by 32,768 and an indication will be provided on one of the ΔZ outputs thereby indicating an overflow condition. The larger the number A, the quicker overflow will occur. Thus, the indications at the output on the ΔZ leads will occur more frequently. Being more specific and utilizing the clocking and word bit values indicated previously, if a digital word of 1 is supplied on lead 114, there will be an output once each second since there are 32,768 words per second. On the other hand, if the word on lead 114 is 16,384, an overflow condition will occur every other word and there will be 16,384 pulses per second. Finally if the input word is 32,768, there will be an overflow each word and the output will remain continuously at a logic 1.

It may be ascertained from the above description that this digital to analog converter may be utilized at its output either as a pulse rate indicating means or as an integrated voltage level device. For the purposes of the present invention, the pulse rate indication is utilized rather than the integrated or average pulse level. It will be further realized that the clock rate is picked such that the pulse rate is directly indicative of the digital word in that any digital word in such as 1,000 will result in a corresponding number of pulses per second (i.e., 1,000 pulses per second) occurring at the overflow leads ΔZ. The equations pertinent to FIG. 11 are illustrated in conjunction therewith. As will be realized, the subscript N is utilized to indicate present word time while N − 1 is the previous word time and N + 1 is the following word time.

As will be realized, the output pulses from FIG. 11 are not spikes but are pulses one word length in duration. However, suitable circuitry can be utilized at the input of whatever device receives this information if it is necessary to have spikes rather than square waves. However, as will be illustrated in FIG. 12, the rectangular wave is suitable and desirable for the invention as presently utilized and disclosed.

FIGS. 12–15

SERIAL INTEGRATORS

Figure 12:
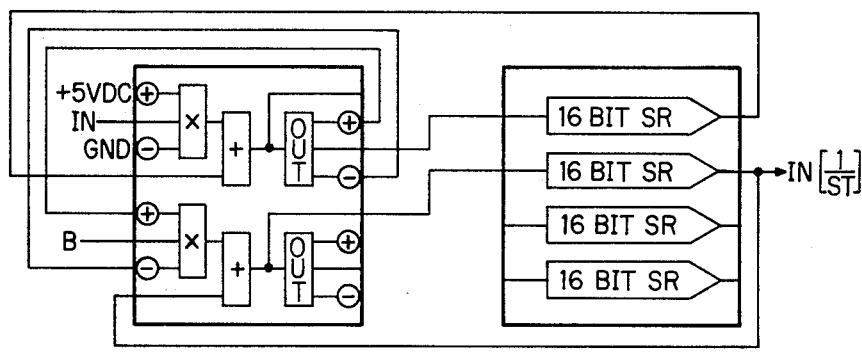
FIG. 12 is an illustration of the connection of the previously referenced flat packs to form a serial integrator.
Figure 13:
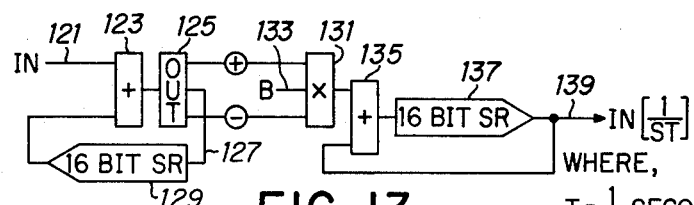
FIG. 13 is a block diagram connection of a serial integrator.

All the previous explanations have been directed toward understanding component parts of the invention and are not believed to comprise inventive subject matter. The remaining figures are believed to comprise inventive subject matter and the first and basic embodiment is a serial integrator, the connection of which in flat pack form is shown in FIG. 12 and the block diagram illustration of which is shown in FIG. 13. As will be noted, the ΔY inputs for the upper portion of the left-hand flat pack in FIG. 12 are connected to ground and +5 volts so that the multiplying circuit is in effect not used in conjunction with the input signal. Thus, this portion of the circuit is deleted in the block diagram format of FIG. 13. However, the remaining components are utilized.

In FIG. 13 an input signal is supplied on a lead 121 to a summing circuit 123 whose output is received by an overflow indication means 125 having an output means 127 supplied through a word delay means 129 to a second input of summing means 123. A second output means comprising the overflow indication means ΔZ is connected to the ΔY inputs of a multiplying means 131. As will be noted, the blocks 123, 125 and 129 comprised a digital word to pulse rate conversion means as described in conjuction with FIG. 8. The remaining portion of the circuit comprises a pulse rate to digital word conversion means whereby an output may be supplied in digital word format representative of the total integrated value of the input with respect to time. An input B designated as 133 is also supplied to multiplying circuit 131 and is passed through the multiplying circuit 131 upon each occurrence of an overflow indication from 125 to the summing means 135. The output of summing means 135 is passed through the shift register or delay means 137 and back to a second input of summing means 135. An output of the shift register 137 is also utilized as the output of the serial integrator on a lead 139.

As illustrated, the input signal supplied on lead 121 appears at the output after a delay in accordance with the formula IN/ST where T = 1/B seconds. In other words, a numerical value in digital binary format appears at the output after the first overflow occurs from block 125. While this digital word may be exactly the same as the input digital word 121 it need not necessarily be and in any event will be merely representative thereof. The input B will normally be held at a constant value during the entire integration operation but could be altered for special types of integration. In any event, the input B determines the slope of the integration process. If both the words on leads 121 and 133 are digital 1's, an overflow condition will occur once each second and it will take 32,768 seconds before the output on lead 139 reaches its maximum capacity. In other words, linear integration may be provided over an entire 32,768 second period. On the other hand, if the input on lead 121 is a digital word of 16,384, overflow conditions will occur evey other digital word and if the input on lead 133 remains at a binary 1, it will only require two seconds for the output to reach its maximum capacity. In each case, however, the incremental steps at the output will occur 1 binary logic level at a time. On the other hand, if the conditions are reversed so that lead 121 has a binary 1 input and lead 133 has a binary 16,383 serial digital word input, it will still take 2 seconds to reach the maximum capacity of the shift register 137 at the output 139. However, in this instance it will be reached in two discreet steps and the accuracy of the integration at any intermediate time will be seriously affected or reduced except at the exact instant of the one second time when the first step occurs. Thus, it is often desirable to keep the B value as low as possible to increase the accuracy of the integrating circuit.

Figure 14:
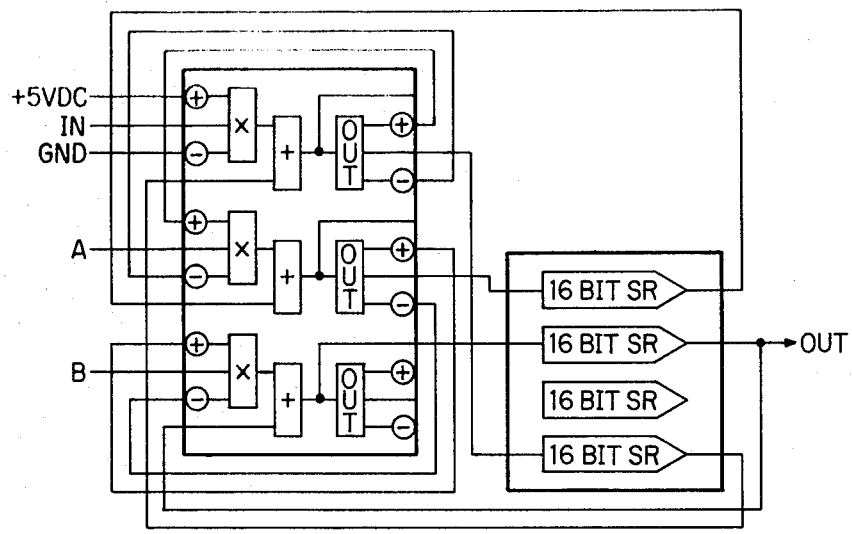
FIG. 14 is an illustration of the connection of various flat packs to form a more complicated integrator.
Figure 15:
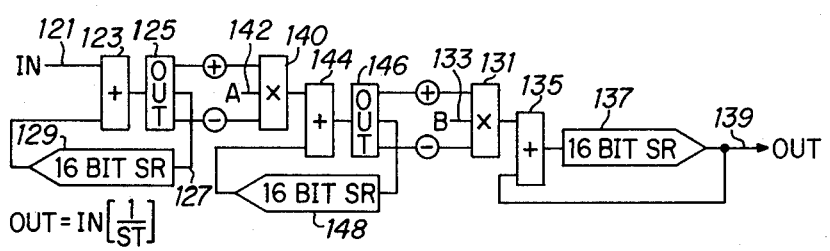
FIG. 15 is a block diagram of an integrator which may have a larger time constant variation than that of FIG. 13.

FIGS. 14 and 15 illustrate the connection of a serial integrator having a larger possible time constant range. Since more than two of the serial R adder circuits are utilized, the flat pack presentation as illustrated in FIG. 14 is altered.

Since the circuitry of FIG. 15 involves all of the circuitry of FIG. 13 wtih an addition, similar components were given the same numbers. The circuitry contains the insertion of another serial R adder which in effect operates to provide a pulse rate to digital word and digital word to pulse rate converter intermediate the old portions. A pulse rate is supplied to the multiplying circuit 140 having an A input 142. An output of multiplying circuit 140 is supplied to a summing circuit 144 whose output is supplied to an overflow indicating means 146 having a R output supplied through a shift register 148 to a second input of summing circuit 144. The shift register 148 performs the storage of the number of occurrences of the pulse rate input as supplied by overflow indicator means 125. However, this pulse rate is modified by the value of the digital word A supplied on lead 142. Thus, the overflow indications supplied by overflow indicating means 146 to the corresponding inputs of multiplier 131 are modified from the output of 125 by the value of the digital word supplied on 142. Thus, by having both of the digital words supplied on 142 and 133 set at their maximum or 32,768 binary word condition and IN is a binary 1, the capacity of register 137 to integrate can be completed in 1/32,768 seconds. On the other hand, if both the digital words supplied on leads 133 and 142 are a binary 1, the total integration time can occur over 32,768 times 32,768 seconds, if the input at lead 121 is also a digital 1. As will be noted, time constant T increases from a maximum of 1 second in FIG. 13 to 32,768 seconds in FIG. 15.

As will be realized, the addition of the components 140–148 to FIG. 13 to form FIG. 15 does not affect the mode of operation but merely alters the time constant T. As is realized by those skilled in the art, the S in the equation represents the Laplace operator. The longer time constant integrator of FIG. 15 is illustrated in view of the fact that it is the basis of most of the remaining circuits.

SERIAL FILTER

FIGS. 16–17

Figure 16:
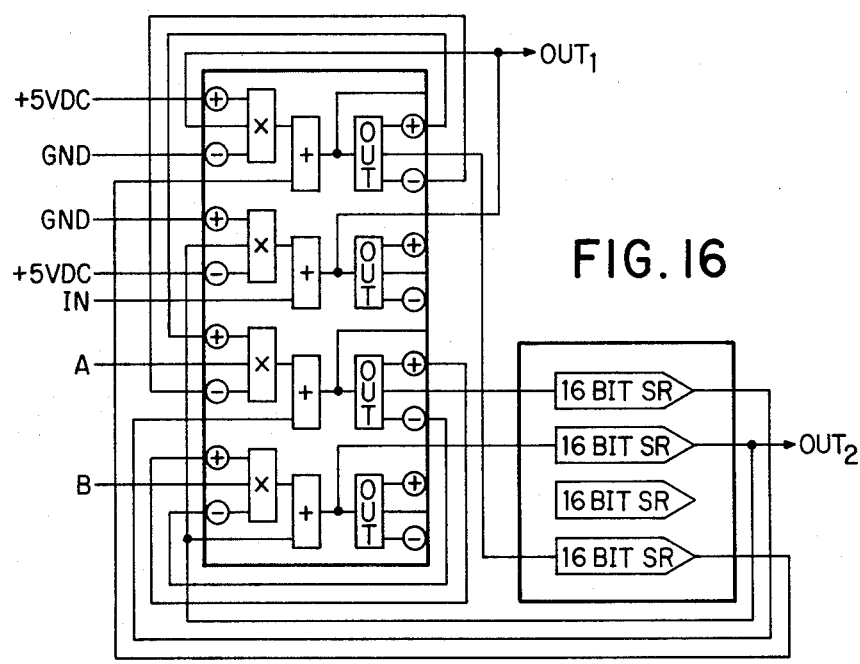
FIG. 16 illustrates the connection of flat packs to form a serial filter.
Figure 17:
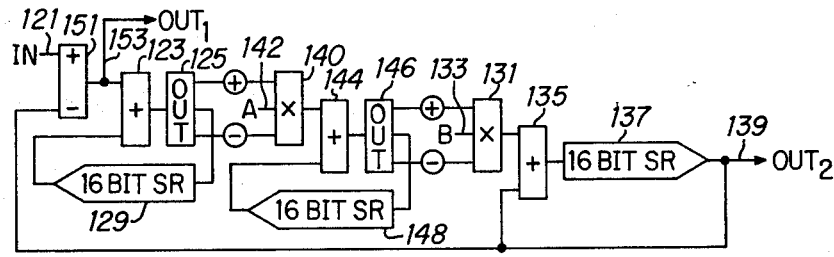
FIG. 17 is a block diagram of the connection shown in FIG. 16.

By adding feedback around the serial integrator of FIG. 15 and summing this with or comparing it to the input, a serial filter may be formed as shown in FIGS. 16 and 17. Again, FIG. 16 merely illustrates the connection of the various components of the flat pack and the voltage levels applied to a pair of the $\Delta Y$ inputs.

FIG. 17 illustrates the block schematic diagram of the connection of FIG. 16. As will be realized, the second from the top serial R adder of the left-hand flat pack is merely utilized as a serial subtractor as illustrated in FIG. 8. FIG. 17 has been given the same designations as FIG. 15 with the exception that there is added thereto a new block 151 having an output 153.

As may be realized, the output of a true integrator changes continuously as long as there is an input. A filter on the other hand will provide an output representative of the input after a predetermined length of time in a stable condition. As long as the input is changing, however, the output also changes at a delay time determined by the circuit constants. As will be noted, the output lead 139 is compred in the subtracting circuit 151 with the input 121. When these two values are equal, there is no output on lead 153 and thus there is no input supplied thereto to be further integrated and the output at lead 139 and accordingly the digital word stored in shift register 137 remains the same and is identical with the digital word on lead 121. The portion between lead 153 and 139 performs a 1/ST function and thus the low pass equation of FIG. 17 can be developed from equation 1 presented below.

$$OUT_2 = 1/ST \; (IN-OUT_2) \quad (1)$$

The high pass filter formula of FIG. 17 may be developed from the following equations 2–5.

$$OUT_2 = OUT_1(1/ST) \quad (2)$$

$$OUT_1 = IN - OUT_1(1/ST) \quad (3)$$

$$OUT_1 + OUT_1(1/ST) = IN \quad (4)$$

$$OUT_1(1 + 1/ST) = IN \quad (5)$$

In this case the output on lead 153 follows the change in input and this output gradually diminishes to 0 in accordance with the time constant.

SERIAL MULTIPLICATION FILTER

FIGS. 18–20

Figure 18:
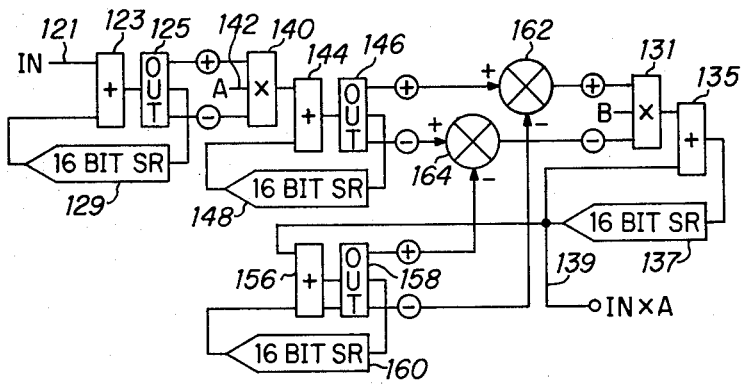
FIG. 18 is a block diagram of a serial multiplication filter.

FIG. 18 utilizes the integrator of FIG. 15 and adds the portion designated by numbers 156–164. The output from block 146 is a pulse rate indicative of the multiplication of the digital words on 121 and 142. This, of course, is the same as in FIG. 15. However, FIG. 15 did not allow the output to remain at a stationary value. Thus, the pulse rate to digital word converter of blocks 131 to 137 is supplemented by the feedback circuit comprising a digital word to pulse rate converter and including blocks 156–160 whose outputs are compared in the two summing or comparison networks 162 and 164 such that there are no further effective pulses applied to 131 when the digital word received from shift register 137 is identical to the product of the two digital words appearing on leads 121 and 142. While the circuitry of FIG. 18 is complete and operable, it is necessarily bulky and the blocks 162 and 164 would require further flat packs. Therefore, the various functions of the circuit have been combined to produce the block diagram of FIG. 19 wherein the summing of the digital words occur in blocks 144 and 167 intermediate blocks 140 and 146. As previously indicated, the intermediate portion of the integrator of FIG. 15 performed the functions of the changing the rate input to a digital word and then changing it back to a rate. Thus, the block 167 is inserted at the point where the digital word has again occurred and it is satisfactorily summed and the output is obtained as shown in the equations of FIG. 19.

Normally the feedback signal on 173 would be subtracted from the multiplied signal in 144. This however would require a further R-adder unit. Hardware economy may be realized by adding in block 144 and then subtracting in 167. However, with block 167 a subtractor, block 123' must also be made a subtractor to keep the proper polarity in the answer.

Figure 19:
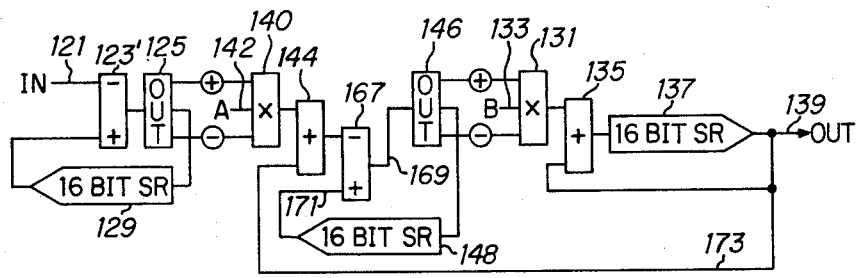
FIG. 19 is a block diagram of a simplified or more compact version of FIG. 18.

Thus, multiplication is obtained in the circuit of FIG. 19 by producing a pulse rate equivalent to the product of the inputs on lines 121 and 142, changing this to a digital word which is compared with the output word of the apparatus, and the difference is then applied to a combination digital word to pulse rate and pulse rate to digital word integration apparatus formed from blocks 146, 131, 135, and 137. When there is no difference between the average value of the product as obtained from block 140 and the end result as obtained from shift register 137, there will be no further input to the integrator and the output will not change further.

As will be realized, the output at 139 is not obtained instantly but is a gradually changing value which increases in accuracy with time.

Summarizing, FIGS. 18 and 19 operate in a very similar manner but not identically. FIG. 18 utilizes the digital words to produce a pulse rate which is compared with a pulse rate obtained from a digital word to pulse rate converter connected to receive digital words from the output. The difference in pulse rates between the rate obtained from the digital input word product and the feedback set of pulse rates is then used to produce a digital word. FIG. 19 on the other hand simplifies this process by eliminating the requirement for an output digital word to pulse rate converter whereby the output word is combined directly with the digital word product of the two inputs in the intermediate stage of the integrator as shown.

Figure 20:
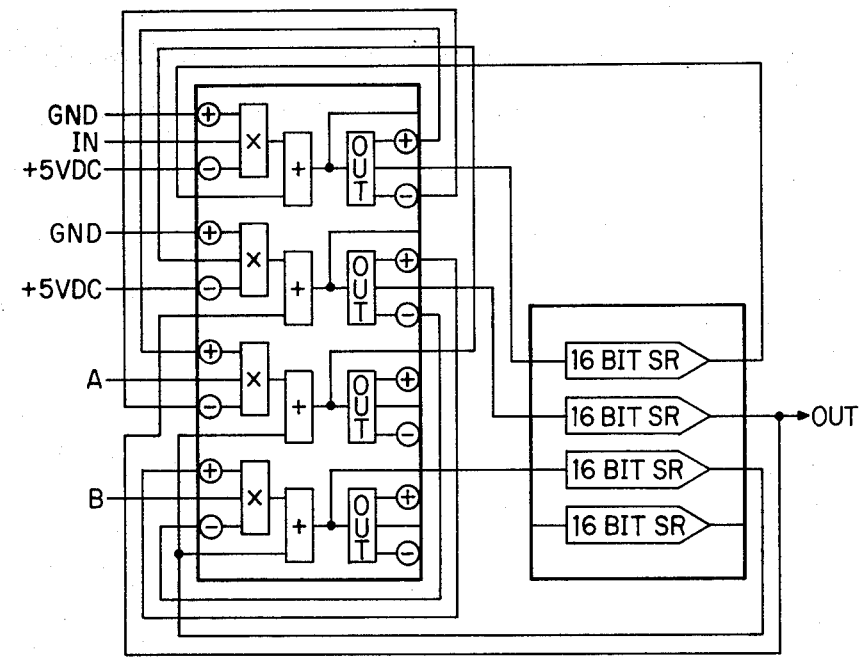
FIG. 20 is an illustration of the connection of flat packs to produce the circuitry of FIG. 19.

FIG. 20, as before, merely illustrates a connection of three flat packs to perform the function illustrated in the blocks of FIG. 19.

SERIAL DIVISION FILTER

FIGS. 21–23

Figure 21:
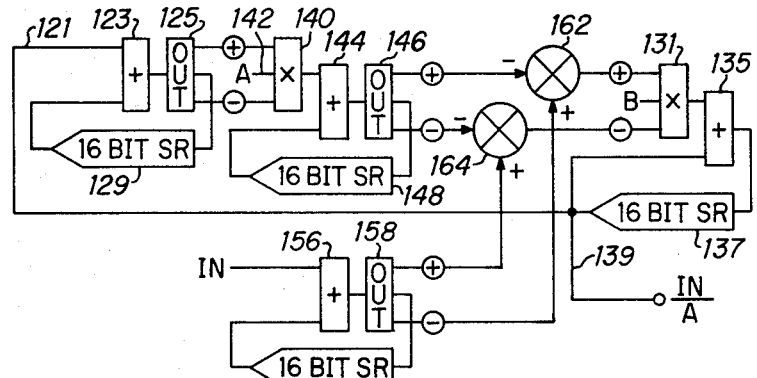
FIG. 21 is a block diagram of a serial division filter.
Figure 22:
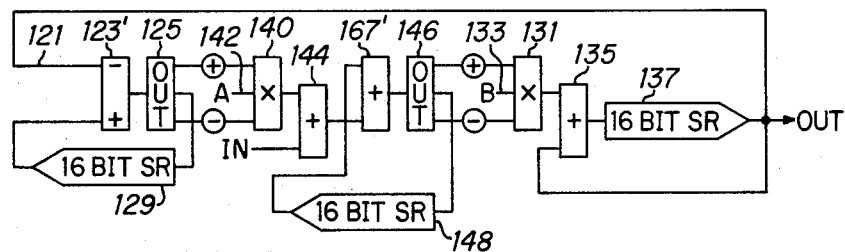
FIG. 22 is a block diagram showing a simpler form of the circuit of FIG. 21.

In comparing FIG. 21 with FIG. 18 it will be noted that they are nearly identical except for the interchange of the application of the input and feedback signals. Likewise, FIG. 22 over FIG. 19 has the same changes plus the change of block 167 to an adder 167'. In other words, the output lead 139 from shift register 137 is now applied to the 121 input of block 123 instead of to the similar input of block 156. The feedback in FIG. 22 is applied in a more conventional subtracting fashion in 123' thereby permitting the output of register 148 to be added to the incoming signal as previously explained. Accordingly, the input is now applied to an input terminal of block 156 in FIG. 21 and 144 in FIG. 22. These changes result in an output indicative of the input signal divided by the digital word A applied on lead 142. Again, the explanation of operation is very similar. A digital word designated as IN is applied to a first digital to pulse converter and is compared with a second pulse rate. If this pulse rate is not identical, an output is obtained from the comparison circuits 162 and 164 and applied to the pulse rate to digital word converter comprising blocks 131–137. As long as there is no comparison, an output which is changing in digital word vaue is obtained on lead 139. It may be assumed that this output is the value IN divided by some term such as a digital word A. This digital word is then converted to a pulse rate in the portion of FIG. 21 including blocks 123–129. This pulse rate is then multiplied times the digital word A to produce a new pulse rate. If it may be assumed that the input to block 123 is the input divided by A, the multiplication times A will then produce an output which is indicative of only the input when the circuit is stabilized. Thus, after a predetermined time constant as determined by the input B applied to multiplication circuit 131 and by the A word input applied on lead 142, the circuit will stabilize and there will be no difference between the pulse rate from block 146 and the pulse rate from block 158. At this time the output digital word is representative of the quotient.

In summary, FIG. 21 produces a pulse rate representative of an input and compares this with an unknown rate before converting the comparison product to a digital word. There will be a continuous change in the output until the comparison produces a 0 product. By taking the output and assuming it to be the desired answer, this answer can be utilized in combination with a further digital word to produce a pulse rate equivalent to that produced by the input digital word to pulse rate converter.

As was the case with FIG. 18, FIG. 21 may be simplified and is shown as FIG. 22. The operation of FIG, 22 is comparable to FIG. 21 in the same manner that FIG. 19 is comparable to FIG. 18. In other words, while FIG. 21 compares pulse rates, FIG. 22 compares digital words. The digital word comparison of the input word to the feedback word as modified by the digital input word A on lead 142 occurs in summing means 144 and 167'. In view of the previous explanations, further explanatory material for FIG. 22 is believed unnecessary.

Figure 23:
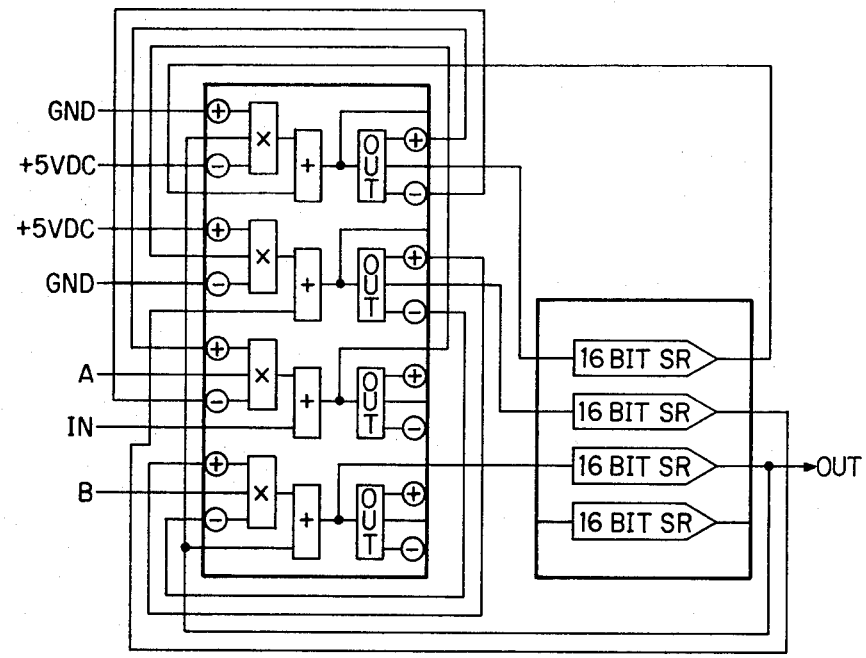
FIG. 23 illustrates a connection of flat packs to produce the circuit of FIG. 22.

FIG. 23 illustrates the connection of a plurality of flat packs to produce the illustrated connection system for providing serial division.

SERIAL SQUARE ROOT FILTER

FIGS. 24–26

Figure 24:
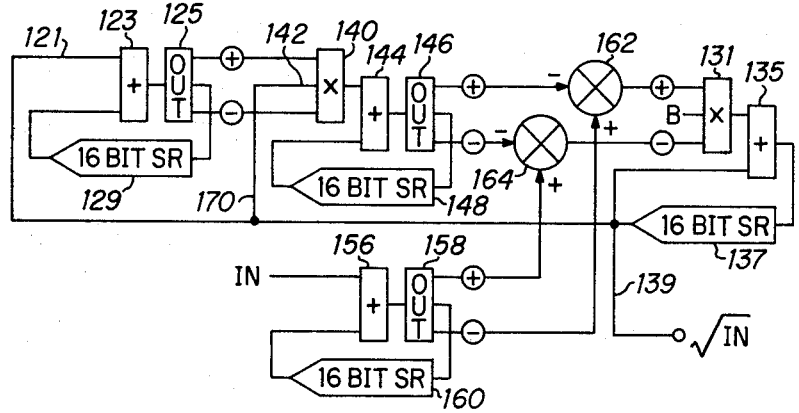
FIG. 24 illustrates a method in which the blocks can be connected whereby the square root of a serial digital input word may be obtained.

As will be noted from an observation of FIG. 24, the only additional item in FIG. 24 over that shown in FIG. 21 is a lead designated as 170. This lead provides the input to input 142 of multiplication block 140 instead of the previously provided A input. This time, however, the signal being fed back is assumed to be the square root of the input signal. If the signal that is fed back to block 123 is the same as the signal by which it is multiplied in block 140, the result at the output of block 146 should be the product of two square root terms which in turn will produce as a product the signal IN as represented by the pulse rate obtained from the overflow indicators of block 158.

Figure 25:
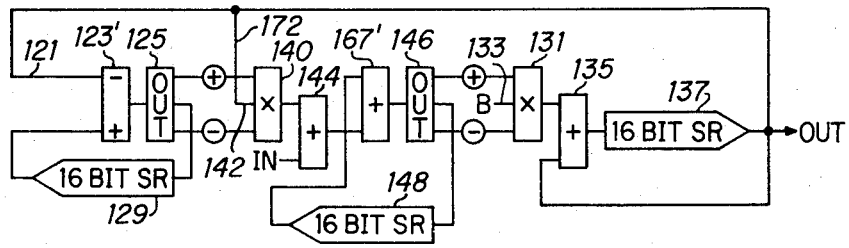
FIG. 25 is a different connection whereby some of the components of FIG. 24 can be eliminated to obtain the same function.

Observation of FIG, 25 will provide the information that a similar modification to FIG. 22 will result in FIG. 25 as is shown by the addition of lead 172 to replace the previous A input. Again, FIG. 25 is merely a simplification of the number of blocks required to the more easily explainable FIG. 24 and provides exactly the same function as explained and as shown in the associated formulas therebelow.

Figure 26:
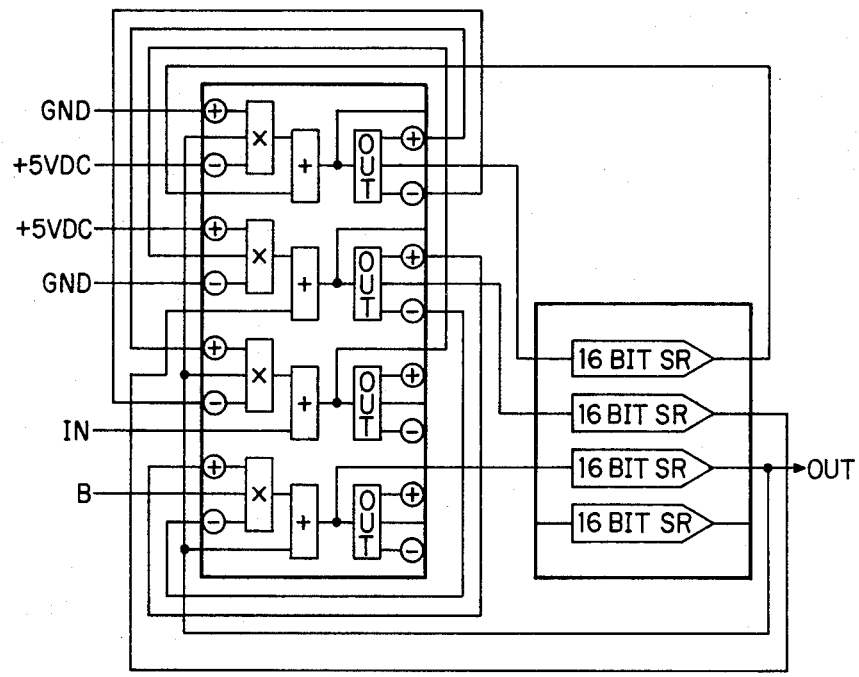
FIG. 26 is an illustration of the manner in which flat packs may be connected to perform the function of FIG. 25.

FIG. 26 is a flat pack connection illustration for producing the circuit of FIG. 25.

As is the case with the division and multiplication circuits, the answer is not immediately available but rather increases in accuracy as a direct function of time.

ACCELERATED ACTION MULTIPLIER

FIG. 27

Figure 27:
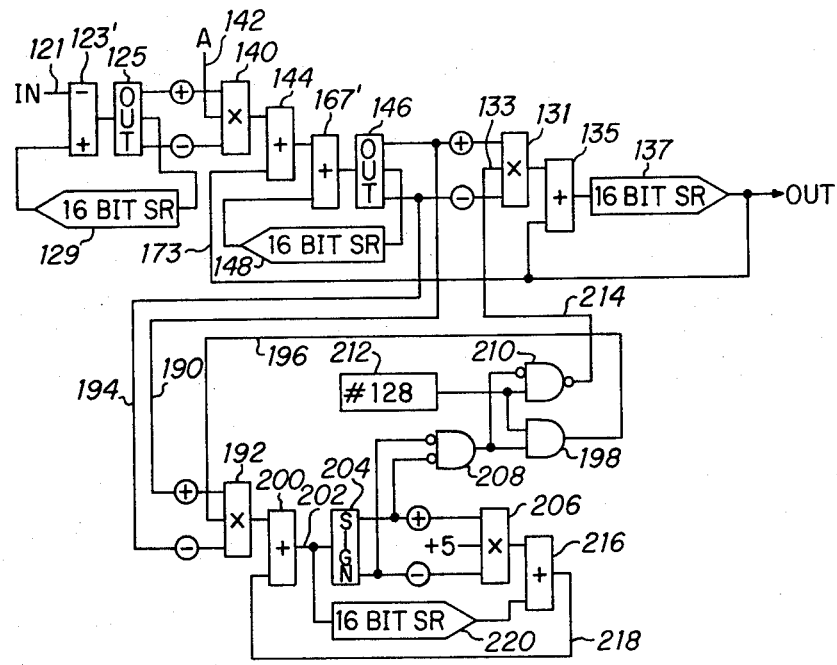
FIG. 27 is a circuit diagram for an accelerated action multiplier improvement over the circuit of FIG. 19.

As will be noted, the main portion of FIG. 27 is identical to FIG. 19 with the exception that the block 167 is an adding circuit instead of a subtracting. Thus, it is designated as 167' as in FIG. 22. In FIG. 19 there was a choice in getting the correct polarity at the output between making block 167 a subtractor and utilizing a negative digital word for input B. The apparatus added by the present circuit automatically provides a negative word for the digital word input of block 131 and thus the block 167' can be an adder.

The positive output of block 146 is designated as lead 190 and is connected to a similar input of a multiplying circuit 192. The negative output of block 146 is connected to the similar input on block 192 via a lead 194. The digital word input of multiplier 192 is received on a line 196 from an AND gate 198. An output of multiplying circuit 192 is connected to a first input of a summing means 200. An output of summer 200 is connected via a lead 202 to a sign detection circuit 204. Sign detection circuit 204 is shown in more detail in FIG. 28. The positive output of sign detection circuit 204 is connected to a similar input on a multiplying circuit 206 and to an inverting input on a AND gate 208. The negative output of sign detection circuit 204 is connected to a similar input on multiplying circuit 206 and also to an inverting input on AND gate 208. The two inverting inputs on gate 208 effectively alter an AND gate to a NOR gate which has an output connected to a first input of AND gate 198 and to an inverting input of a second AND gate 210. A source of a serial digital binary number 212 provides a digital input to a second input of AND gate 198 and also to a second input of AND gate 210. The output of AND gate 210 is inverted and supplied on a lead 214 to input 133 of block 131. The digital word source 212 in the present embodiment provides a digital input word of +128. As shown in the lower part of FIG. 27 numerical word 128 is a binary number having all zeros except that the 8th from the least significant bit is a logic 1. As will be later explained, the output of AND gate 210 is either a binary −1 or a binary −129. As will be noted, a binary −129 is the exact inversion of positive 128. The multiplying circuit 206 has a digital input lead connected to a +5 volts which effectively provides a numerical serial word of −1 as an input thereto since a binary −1 digital word comprises all logic 1's. An output of multiplying circuit 206 is connected to a first input of a summing circuit 216 having its output connected to a second input of a summing circuit 200 via a lead 218. A 16-bit shift register 220 is connected between lead 202 and a second input of summing circuit 216. As may be noted, summing circuits 200 and 216 are both adding circuits in this embodiment.

Before proceeding to describe the operation of the added circuitry to the multiplying circuit it should be noted that in normal conditions an output is obtained on lead 214. This output comprises a continuous series of logic 1's which represent a binary word of −1. This result is obtained because there is no word circulating in the shift register 220 and thus both the outputs of the sign detector circuit 204 are logic 0 thereby providing a logic 1 output from 208. Since the output of 208 is inverted, there will be a continuous logic 1 output from 210 as inverted. Thus, upon the occurrence of a first pulse from either the positive or negative output of the overflow indicator 146, the pulse will be multiplied times a −1 in multiplying circuit 131 and will increment the count in shift register 137 as would normally occur.

A pulse appearing on the output of overflow detection means 146 will also provide a pulse input to multiplying circuit 192. The logic 1 appearing on the output of 208 will activate gate 198 and thus the positive binary number 128 will flow through lead 196 to the input of multiplying circuit 192. Thus, the binary digital word 128 will be summed in summing means 200 with the output from summing means 216. Since it has been assumed that this circuit was in an inactive state, there will be no binary word in shift register 220 and thus the number 128 will be added to the binary word zero and the output on 202 will also be a binary 128. The sign detection circuit 204 will detect that there is a positive number being applied thereto and thus an output will appear on the positive lead to thereby render the output of 208 a logic 0 commencing with the start of the next word time after the occurrence of the pulse. As will be realized from previous descriptions, the pulse input on lead 190 is a full word period long. Thus, there is a binary −1 digital word input at 133 until the end of the pulse from block 146. The occurrence of a logic 0 at the output of 208 will activate gate 210 to provide an inversion of positive binary digital word 128 to produce the binary digital word −129 on lead 214 during the word time immediately following the pulse output from 146. This binary digital word of −129 on lead 214 will remain as long as there is an output on either lead of sign detection circuit 204. The binary 0 on the output of 208 will inactivate AND gate 198 and prevent further application of the positive binary number 128 to lead 196. Thus, the output on the positive terminal of 204 will combine with the logic 1 applied on the digital word input of 206 to produce an output of a continuous string of 1's. This, as is well known, is indicative of a binary −1. Summing circuit 216 will combine this binary −1 with the binary +128 received from shift register 220 and produce an output representative of a binary +127. During the next word time the binary 127 will be summed in summing circuit 200 with a 0 being received from 192 and will thus again be applied to sign detection circuit 204 and shift register 220. Sign detection circuit 204 will detect that this is still a positive number and will provide an output accordingly. Thus, another −1 will be received from 206 and combined with the digital word 127 to reduce the output of 216 to a digital word +126. This reduction of the number contained in shift register 220 will continue until it is reduced to a logic 0. At this time the sign detection circuit will no longer detect any logic 1 bits and will again activate AND gate 198 and deactivate gate 210 and 0's will circulate in the count down circuit.

Any pulses which may have occurred due to overflow of the conversion means culminating in block 146 will have reinforced the number in shift register 137 by a value of 129 instead of the customary value of 1. Thus, the present circuit will enhance the multiplication operation if pulses are received from the output of 146 oftener than once every 128 words. If three pulses are received within the 128 word time, the shift register 137 will be enhanced by a digital word 1 upon the occurrence of the first pulse and by a digital word of 129 for each of the next two pulses. After the completion of the 128 word period, the count down circuit will return a binary −1 output on lead 214 and await the receipt of the next pulse. In other words, further pulses at the output of 146 during the count down period have no effect on the count down circuit but only upon the remaining circuitry of the multiplier.

As will be realized from an inspection of the multiplying circuit, the pulse rate at the output of 146 decreases with time. In other words, the pulse rate slows as the output nears the final value. Thus, the present circuit is advantageous in allowing the circuit to quickly approach the final value but will slow down to increment the output more slowly as it approaches the end result. In actual practice it has been determined that the circit advances towards the end result at a high rate until it reaches a number between 128 and 256 bits of the end result. At this time it does not provide enough output pulses from 146 to further activate the count down circuit within its count down time. Thus, the output then approaches the end result one binary bit at a time.

SIGN DETECTION CIRCUIT
FIG. 28

Figure 28:
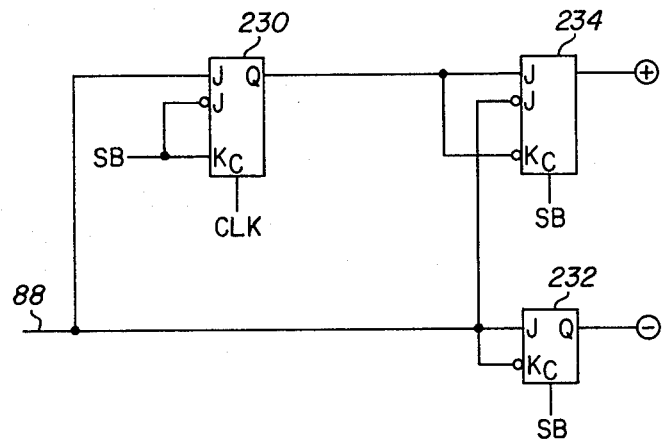
FIG. 28 is a circuit diagram of a sign detection circuit.

As disclosed in FIG. 1 the lower portion thereof is an overflow detection circuit. Some embodiments of the flatpacks incorporating the present invention have contained a sign detection circuit as shown in FIG. 28. The lead shown as 88 corresponds exactly with lead 88 of FIG. 1. Further explanations of the sign detection circuit may be obtained from a copending application entitled "Digital Word Magnitude Selection Circuit Apparatus" having Ser. No. 5086 and filed on the same day as the present invention. However, a brief description of circuit operation will be provided herein.

As may be observed from FIG. 4, all negative numbers have a logic 1 in the most significant or sign bit position. All 0 or positive numbers have a logic 0 in this position. The positive numbers are further distinguished by having at least one logic 1 prior to the sign bit. These three factors are utilized to distinguish between positive, negative, and zero digital numbers in the binary form. The input lead 88 is connected to J inputs of flip-flops 230 and 232 and connected to an inverted J input of a flip-flop 234. A sync bit is used to clock the J-K flip-flops 232 and 234 while a clock input is used to clock J-K flip-flop 230. Additionally, a sync bit is used at the K input and the $\overline{J}$ input of flip-flop 230. As will be noted, the K inputs of flip-flops 232 and 234 receive an inverted version of the signal applied to the J input. If flip-flop 232 is activated at sync bit time and receives a logic 1, an output will be obtained from the Q output of a logic 1 value indicating a negative number. If a logic 0 is applied to the J input, the flip-flop will remain in the previous condition if it previously had a logic 0 at the Q output and will switch to a logic 0 output if it had a logic 1.

If the number appearing on lead 88 is a positive number, the first logic 1 appearing therein will activate flip-flop 230 to produce a logic 1 at the Q output. At the time of the most significant bit there will thus be a logic 1 at the upper J input of 234 and if the most significant bit is a logic 0, the inversion thereof will produce a logic 1 at the lower J input of 234 thereby providing a logic 1 output at the positive output terminal. The sync bit will return J-K flip-flop 230 to a logic 0 at the output in preparation for receipt of the next word.

Both cases of activation of flip-flops 232 and 234 will cause these flip-flops to remain in the activated condition until the sign bit of the next word at which time a new determination will be made of the polarity of the just received word.

As will be obvious, if a digital word indicative of 0 is received, no logic 1's will be received and therefore flip-flop 230 will not be activated and accordingly flip-flop 234 cannot be activated at the most significant bit time.

Although a single embodiment has been shown in FIG. 1 to produce the desired multiplication, summation and overflow indication conditions, it is to be realized that the invention is not restricted thereto. Rather, the inventive concept is illustrated in conjunction with the description of FIGS. 9–26 and includes the concept of utilizing serial digital word to pulse rate and pulse rate to serial digital word converters to provide various functions from an integrator to various types of filter circuits for producing controlled delay or algebraic functions.

I therefore wish to be restricted not to the specific embodiment shown but only to the invention as defined in the appended claims.

I claim:
1. Integrating apparatus comprising, in combination:
first serial digital word summing means including first and second inputs and an output;
first word storage means having input and output means and having a predetermined word length capacity;
first overflow detection means including, input means for receiving serial digital words, output means for providing an output word and overflow indication means for indicating the predetermined word capacity of said first storage means has been exceeded;
means for supplying a digital word first input signal to be integrated to one of said inputs of said first summing means;
means connecting the output of said first summing means to the input of said first detection means;
means connecting said first word storage means between said output means of said first overflow detection means and the other input of said summing means;
first multiplying means including first and second input means and an output;
means connecting said overflow indication means of said first overflow detection means to said first input means of said first multiplying means;
means for supplying a digital word second input signal to said second input means of said first multiplying means;
second serial digital word summing means including first and second inputs and an output;
means connecting the output of said multiplying means to said first input of said second summing means;
second word storage means having input and output means and having a predetermined word length capacity;
means connecting said second word storage means between the output of said second summing means and said second input of said second summing means; and
apparatus output means for supplying an apparatus output signal connected to said output means of said second word storage means.
2. Apparatus as claimed in claim 1 wherein:
said first overflow detection means provides indications of overflow in both the negative and positive directions;
said first and second serial digital word summing means are adding means; and
both storage means have the same predetermined word length capacity.
3. Apparatus as claimed in claim 1 wherein said means connecting said overflow indication means to said first multiplying means comprises, in combination:
second multiplying means including first input means for receiving signals from said overflow indication means of said first overflow detection means, second serial digital word input means and an output;

means for supplying a digital input third signal to said second input means of said second multiplying means;

third serial digital word summing means including first and second inputs and an output;

means connecting said output of said second multiplying means to said first input of said third summing means;

third word storage means having input and output means and having a predetermined word length capacity;

second overflow detection means including, an input means connected to the output of said third summing means, an output means for providing an output word and overflow indication means for indicating the predetermined word capacity of said third storage means has been exceeded;

means connecting said third word storage means between said output means of said second overflow detection means and said second input of said third summing means; and means for supplying overflow signals from said overflow indication means of said second overflow detection means to the first input means of said first multiplying means.

4. Apparatus as claimed in claim 3 wherein said means for supplying a digital word first input signal to be integrated comprises, in combination:

fourth summing means connected to a signal to be filtered and connected to said apparatus output means, said means supplying as a signal to said first input of said first summing means the difference therebetween; and the signal supplied to said first input of said first summing means conforming generally to IN[ST/(1 + ST)] where IN is the input signal to be filtered, S is a Laplace operator and T is a time constant.

5. Apparatus as claimed in claim 3 wherein said means connecting said output of said second multiplying means to said first input of said third summing means comprises, in combination;

fourth summing means including first and second inputs and an output, said first input being connected to receive digital word output signals from said second multiplying means and the output of said fourth summing means connected to supply digital input signals to said first input of said third summing means; and means connecting said second input of said fourth summing means to said apparatus output means for receiving output signals from said second word storage means.

6. Apparatus as claimed in claim 5 wherein said first and third summing means are subtractors and said second and fourth summing means are adders and further said apparatus provides an output indicative of A × B [1/(1 + ST)] where A and B are said first and third digital input signals, S is a Laplace operator and T is a time constant equal to the reciprocal of the second digital input signal.

7. Apparatus as claimed in claim 3 wherein said means connecting said output of said second multiplying means to said first input of said third summing means comprises, in combination:

fourth summing means including first and second inputs and an output and having said first input connected to receive signals from the output of said second multiplying means;

means connecting the output of said fourth summing means to said first input of said third summing means;

means for supplying a digital input fourth signal to said second input of said fourth summing means; and means supplying the output signal of said second word storage means as the digital word first input signal to said first summing means.

8. Apparatus as claimed in claim 7 wherein said first summing means is a subtractor and the remaining summing means are adders and the signal obtained at said apparatus output means is indicative of A/B(1 + ST) where A is the digital input fourth signal, B is the digital input third signal, S is a Laplace operator and T is a time constant.

9. Apparatus as claimed in claim 7 wherein said digital input third signal is obtained from the output of said second word storage means.

10. Apparatus as claimed in claim 9 wherein said first summing means is a subtractor and the remaining summing means are adders and further the output signal from said second storage means is indicative of the square root of said digital input fourth signal.

11. Apparatus for providing an output integrated signal comprising, in combination:

serial digital word to pulse rate first conversion means including an input means for receiving a serial digital word input signal, said first conversion means having a predetermined word capacity and including output means for indicating the frequency with which said word capacity is exceeded;

pulse rate to serial digital word second conversion means including a first input for receiving a pulse rate and a second input for receiving a serial digital word, the numerical value of digital words received by said second conversion means directly affecting the digital word output from the apparatus for a given received pulse rate; and means for connecting the output means of said first conversion means to said first input to said second conversion means.

12. Apparatus as claimed in claim 11 wherein said means for connecting said first and second conversion means comprises, in combination:

combination pulse rate to serial digital word and serial digital word to pulse rate third conversion means, said third conversion means including a serial digital word input means, the numerical value of serial digital words received at said serial digital word input means thereof directly affecting the pulse rate output of said third conversion means for a given received pulse rate.

13. Apparatus as claimed in claim 12 comprising in addition:

summing means connected for receiving an input serial digital word signal to be filtered and for receiving a digital word from the output of said second conversion means, an output of said summing means comprising the difference between received digital words; and means connecting the output of said summing means to the input means of said first conversion means.

14. Apparatus as claimed in claim 11 wherein said means connecting said first and second conversion means comprises, in combination:
  pulse rate to digital word third conversion means including first and second digital word inputs and pulse rate input means, a signal supplied to said first digital word input thereof affecting the magnitude of the digital word output thereof for a given pulse rate input, the digital word received at said second digital word input being compared with the magnitude of the converted and affected pulse rate to produce a third conversion means output;
  digital word to pulse rate fourth conversion means connected to the output of said third conversion means and providing a pulse rate output indicative of the digital word obtained after comparison is completed;
  means connecting the output of said second conversion means to the second digital input of said third conversion means; and
  means connecting said output means of said first conversion means to the pulse rate input of said third conversion means and the pulse rate output of said fourth conversion to said first input of said second conversion means.

15. Apparatus as claimed in claim 11 wherein said means connecting said first and second conversion means comprises, in combination:
  pulse rate to digital word third conversion means including first and second digital word inputs and pulse rate input means, a signal supplied to said first digital word input thereof affecting the magnitude of the digital word output thereof for a given pulse rate input, the digital word received at said second digital word input being compared with the magnitude of the converted and affected pulse rate to produce a third conversion means output;
  digital word to pulse rate fourth conversion means connected to the output of said third conversion means and providing a pulse rate output indicative of the digital word obtained after comparison is completed;
  means connecting the output of said second conversion means to the input means of said first conversion means;
  means for supplying a dividend serial digital signal to said second digital word input of said third conversion means and for supplying a serial digital word divisor to said first digital word input of said third conversion means; and
  means connecting said output means of said first conversion means to the pulse rate input of said third conversion means and the pulse rate output of said fourth conversion means to said first input of said second conversion means.

16. Apparatus as claimed in claim 11 wherein said means connecting said first and second conversion means comprises, in combination:
  pulse rate to digital word third conversion means including first and second digital word inputs and pulse rate input means, a signal supplied to said first digital input means thereof affecting the magnitude of the digital word output for a given pulse rate input, the digital word received at said second digital word input being compared with the magnitude of the converted and affected pulse rate to produce a third conversion means output;
  digital word to pulse rate fourth conversion means connected to the output of said third conversion means and providing a pulse rate output indicative of the digital word obtained after comparison transpires;
  means connecting the output of said second conversion means to said input means of said first conversion means and to said first digital word input of said third conversion means;
  means for supplying a serial digital word, the square root of which is to be found, to said second digital word input of said third conversion means; and
  means connecting said output means of said first conversion means to the pulse rate input of said third conversion means and the pulse rate output of said fourth conversion means to said first input of said second conversion means.

17. Apparatus as claimed in claim 11 wherein said means for connecting the first and second conversion means includes:
  signal combining means, including pulse input means, for combining the pulse rate received from said first conversion means with a further pulse rate received at said pulse input means and supplying the difference in pulse rates to said second conversion means;
  said apparatus comprising in addition:
    serial digital word to pulse rate third conversion means including a first input means for receiving a serial digital word input signal and including output means for providing a pulse rate output indicative of the digital word input; and
    means connecting said third conversion means between the output means of said second conversion means and the pulse input means of said combining means adapted for receiving a further pulse rate input signal.

18. Apparatus as claimed in claim 11 wherein said means for connecting the first and second conversion means includes;
  signal combining means, including pulse input means, for combining the pulse rate received from said first conversion means with a further pulse rate received at said first input means and supplying the difference in pulse rates to said second conversion means;
  said apparatus comprising in addition:
    means connecting the output of said second conversion means to an input means of said first conversion means;
    serial digital word to pulse rate third conversion means including a first input means for receiving a serial digital word input signal and including output means for providing a pulse rate output indicative of the digital word input;
    means connecting said output means of said third conversion means to the pulse input means of the signal combining means; and
    means for supplying a further digital input signal to said first conversion means, the further digital word signal comprising a divisor and the digital word supplied to said third conversion means comprising a dividend.

19. Apparatus as claimed in claim 18 further comprising:
  said means for supplying a further digital input signal to said first conversion means is connected to said output means of said second conversion means for receiving the apparatus output word therefrom whereby an output representative of the square root of the input signal supplied to said third conversion means is provided.

20. Apparatus as claimed in claim 5 comprising in addition;

third multiplying means including first and second input means and an output;

means for supplying the overflow indication word from said overflow indication means of said second detection means to said first input means of said third multiplying means;

fifth summing means including first and second inputs and an output, said first input being connected to receive digital word output signals from said third multiplying means;

sign detection means including input means and first and second output means whereby said first output means is activated upon a digital input word being received of a first polarity and the second output means being activated upon the reception of a digital word of a second polarity;

fourth multiplying means including, first input means for receiving signals from said first and second output means of said sign detection means, serial digital word input means and an output;

sixth summing means including first and second inputs and an output, said first input being connected to receive digital word output signals from said fourth multiplying means and the output thereof being connected to supply digital word inputs to said second input of said fifth summing means;

shift register means connected to receive output signals from said fifth summing means and to supply an output delayed by one word time to said second input of said sixth summing means;

NOR gate means including first and second inputs connected to said first and second outputs of said sign detection means and including an output;

means for supplying a digital input fourth signal;

second gating means connected for receiving the digital input fourth signal from said last named means and for receiving an output from said NOR gate and providing a logical output indicative thereof;

means connecting the output of said second gate to said second input of said third multiplying means;

third gating means connected for receiving said digital input fourth signal from said means for supplying same and connected for receiving an inverted version of the output signal from said first gating means, said third gating means providing an inverted logically ANDed output indicative of the received inputs; and means connecting the logical output of said third gating means to said means for supplying a digital word second input signal to said second input of said first multiplying means.

21. Apparatus as claimed im claim 14 further comprising pulse detection means connected between the output of said third conversion means and the second input of said second conversion means, said pulse detection means having a predetermined count down time period whereby a first digital word is supplied to said second conversion means if first and second pulses are received sequentially from said third conversion means within said predetermined time period and provides a second digital word to said second conversion means if two pulses are not received sequentially within said time period whereby the rate of multiplication is increased when the product of the digital words received at said first conversion means and at the first digital word input of said third conversion means varies greatly from the digital word obtained from the output of said second conversion means.

* * * * *